United States Patent
Chiang et al.

(10) Patent No.: US 11,109,064 B2
(45) Date of Patent: Aug. 31, 2021

(54) SIGNALING OF MOTION VECTOR DIFFERENCE DERIVATION

(71) Applicant: MediaTek Inc., Hsinchu (TW)

(72) Inventors: Man-Shu Chiang, Hsinchu (TW); Chih-Wei Hsu, Hsinchu (TW); Tzu-Der Chuang, Hsinchu (TW)

(73) Assignee: MediaTek Inc., Hsinchu (TW)

( * ) Notice: Subject to any disclaimer, the term of this patent is extended or adjusted under 35 U.S.C. 154(b) by 0 days.

(21) Appl. No.: 16/880,344

(22) Filed: May 21, 2020

(65) Prior Publication Data

US 2020/0374551 A1 Nov. 26, 2020

Related U.S. Application Data (60) Provisional application No. 62/851,140, filed on May 22, 2019.

(51) Int. Cl.
| | |
|---|---|
| *H04N 19/00* | (2014.01) |
| *H04N 19/577* | (2014.01) |
| *H04N 19/513* | (2014.01) |
| *H04N 19/176* | (2014.01) |

(52) U.S. Cl.
CPC ......... *H04N 19/577* (2014.11); *H04N 19/176* (2014.11); *H04N 19/513* (2014.11)

(58) Field of Classification Search
CPC .................................................... H04N 19/00
See application file for complete search history.

(56) References Cited

U.S. PATENT DOCUMENTS

| | | |
|---|---|---|
| 2014/0192885 A1 | 7/2014 | Seregin et al. |
| 2016/0165260 A1* | 6/2016 | Lee ...................... H04N 19/176 375/240.12 |
| 2019/0007699 A1 | 1/2019 | Liu et al. |

OTHER PUBLICATIONS

China National Intellectual Property Administration, International Search Report and Written Opinion for PCT/CN2020/091790, dated Aug. 27, 2020.

* cited by examiner

*Primary Examiner* — Maryam A Nasri
(74) *Attorney, Agent, or Firm* — Oblon, McClelland, Maier & Neustadt, L.L.P.

(57) ABSTRACT

A video decoder receives data for a block of pixels to be decoded as a current block of a current picture of a video. When the current block is coded by using inter mode and bi-directional prediction, the video decoder receives a first motion vector difference and determines a second motion vector difference based on a first flag or a second flag. When the first flag is false, the video decoder uses the second flag to determine whether to set the second motion vector difference to be at an opposite value of the first motion vector difference. When the first flag is true, the video decoder sets the second motion vector difference to be zero. The video decoder reconstructs the current block by using motion information based on the first motion vector difference and the second motion vector difference to perform inter prediction.

19 Claims, 8 Drawing Sheets

SIGNALING OF MOTION VECTOR DIFFERENCE DERIVATION

CROSS REFERENCE TO RELATED PATENT APPLICATION(S)

The present disclosure is part of a non-provisional application that claims the priority benefit of U.S. Provisional Patent Application No. 62/851,140, filed on 22 May 2019. Contents of above-listed application are herein incorporated by reference.

TECHNICAL FIELD

The present disclosure relates generally to video coding. In particular, the present disclosure relates to signaling of motion vector difference for inter prediction.

BACKGROUND

Unless otherwise indicated herein, approaches described in this section are not prior art to the claims listed below and are not admitted as prior art by inclusion in this section.

High-Efficiency Video Coding (HEVC) is a new international video coding standard developed by the Joint Collaborative Team on Video Coding (JCT-VC). HEVC is based on the hybrid block-based motion-compensated DCT-like transform coding architecture. The basic unit for compression, termed coding unit (CU), is a 2N×2N square block, and each CU can be recursively split into four smaller CUs until the predefined minimum size is reached. Each CU contains one or multiple prediction units (PUs).

To improve coding efficiency of hybrid coding architecture, HEVC provides two types of prediction modes for each PU, which are intra prediction and inter prediction. For intra prediction modes, the spatial neighboring reconstructed pixels can be used to generate the directional predictions. There are up to 35 directions in HEVC. For inter prediction modes, the temporal reconstructed reference frames can be used to generate motion compensated predictions. There are three different modes, including Skip, Merge and Inter Advanced Motion Vector Prediction (AMVP) modes.

When a PU is coded in Inter AMVP mode, motion-compensated prediction is performed with transmitted motion vector differences (MVDs) that can be used together with Motion Vector Predictors (MVPs) for deriving motion vectors (MVs). To decide MVP in Inter AMVP mode, the advanced motion vector prediction (AMVP) scheme is used to select a motion vector predictor among an AMVP candidate set including two spatial MVPs and one temporal MVP. So, in AMVP mode, MVP index for MVP and the corresponding MVDs are required to be encoded and transmitted. In addition, the inter prediction direction to specify the prediction directions among bi-prediction, and uni-prediction which are list-0 (L0) and list-1 (L1), accompanied with the reference frame index for each list should also be encoded and transmitted.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

Some embodiments of the disclosure provides a method for signaling motion vector difference values. A video decoder receives data for a block of pixels to be decoded as a current block of a current picture of a video. When the current block is coded by using inter mode and bi-directional prediction, the video decoder receives a first motion vector difference and derives a second motion vector difference based on the first flag or the second flag. When the first flag is false, the video decoder uses the second flag to determine whether to set the second motion vector difference to be an opposite value of the first motion vector difference. When the first flag is true, the video decoder sets the second motion vector difference to be zero. The video decoder reconstructs the current block by using motion information based on the first motion vector difference and the second motion vector difference to perform inter prediction.

BRIEF DESCRIPTION OF THE DRAWINGS

The accompanying drawings are included to provide a further understanding of the present disclosure, and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

DETAILED DESCRIPTION

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

I. Symmetric Motion Vector Difference (SMVD) Mode

Besides the normal unidirectional prediction and bi-directional prediction mode MVD signaling, SMVD mode for bi-predictional MVD signaling is applied. In the symmetric MVD mode, motion information including reference picture indices of both list-0 and list-1 and MVD of list-1 are not signaled but derived. Symmetric Motion Vector Difference (SMVD) mode is an inter prediction mode in which motion information are symmetrically determined or inferred. Specifically, in some embodiments, motion vector difference in L1 direction (denoted as MVD1 or MVDL1) is determined based on a motion vector difference in L0 direction (denoted as MVD0 or MVDL0). In some embodiments, the L1 reference picture and the L0 reference picture are temporally or POC equally distanced from the current picture (may be determined based on picture order count (POC) or any other factor related to temporal domain or POC). In some embodiments, under SMVD mode, MVD1 is infer to be equal to –MVD0. In some embodiments, when SMVD mode flag is true, BDOF is not applied to the prediction to reduce the complexity.

In some embodiments, a reference pair (ref_idx_l0 and ref_idx_l1) are not signaled but derived (ref_idx_l0 is reference index pointing into reference picture list-0 and ref_idx_l1 is reference index pointing into reference picture list-1). In some embodiments, MVD0 is signaled, but MVD1 is not signaled but inferred.

In some embodiments, at CU level, a SMVD mode flag, which indicates whether symmetric mode (or SMVD mode) is used or not, is explicitly signaled, if an enabling condition for SMVD mode is satisfied. When the symmetrical mode flag is true, only mvp_l0_flag, mvp_l1_flag and MVD0 are explicitly signaled. The reference indices for list-0 and list-1, denoted as (RefIdxSymL0, RefIdxSymL1), are set equal to the pair of reference pictures, respectively. MVD1 is set equal to (–MVD0). MV calculation according to SMVD mode is according to the following:

$$\begin{cases} (mvx_0, mvy_0) = (mvpx_0 + mvdx_0, mvpy_0 + mvdy_0) \\ (mvx_1, mvy_1) = (mvpx_1 - mvdx_0, mvpy_1 - mvdy_0) \end{cases}$$

L0 MV=$(mvx_0, mvy_0)$, L0 predictor=$(mvpx_0, mvpy_0)$, L0 MVD or MVD0=$(mvdx_0, mvdy_0)$. L1 MV=$(mvx_1, mvy_1)$, L1 predictor=$(mvpx_1, mvpy_1)$. L1 MVD or MVD1=$(mvdx_1, mvdy_1)$, but is inferred to be $(-mvdx_0, -mvdy_0)$ or –MVD0 because of SMVD mode.

II. L1 Motion Vector Difference Derivation

In some embodiments, when the current CU or PU is inter-coded and bi-prediction is allowed (e.g. when the current CU or PU is in a B-frame or B-slice), multiple different settings may be used to implicitly derive MVD1. One of these settings, which may be used to implicitly derive MVD1, is SMVD mode. When an enabling condition for SMVD mode (denoted as condition A) is satisfied and the SMVD mode flag is true, MVD1 is set to equal to –MVD0 rather than explicitly signaled. In some embodiments, the SMVD mode flag may be signaled at CU/PU, CTU, slice, tile, tile group, SPS, PPS, or picture level.

Another setting that may be used to implicitly derive MVD1 is zero MVD1 mode, which is activated by mvd_l1_zero_flag. When an enabling condition for mvd_l1_zero_flag (denoted as condition B) is satisfied and mvd_l1_zero_flag is true, MVD1 is set to zero rather than explicitly signaled. In some embodiments, the mvd_l1_zero_flag may be signaled at CU/PU, CTU, slice, tile, tile group, SPS, PPS, or picture level.

In some embodiments, picture level refers to picture header (PH). The PH syntax structure contains information that is common for all slices of the coded picture associated with the PH syntax structure.

Figure 1:
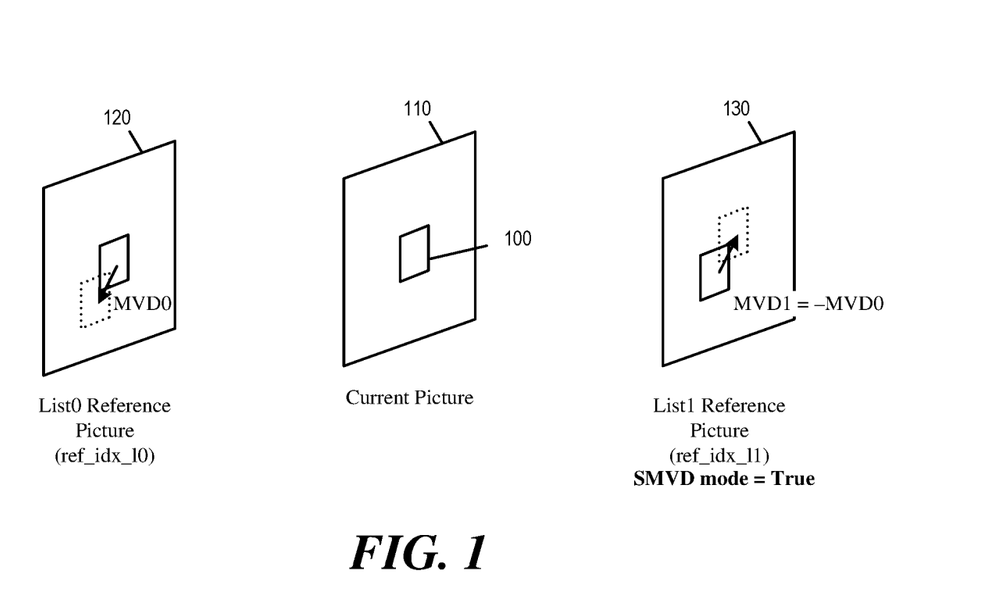
FIG. 1 conceptually illustrates inter-prediction of the current block when SMVD mode flag is true.
Figure 2:
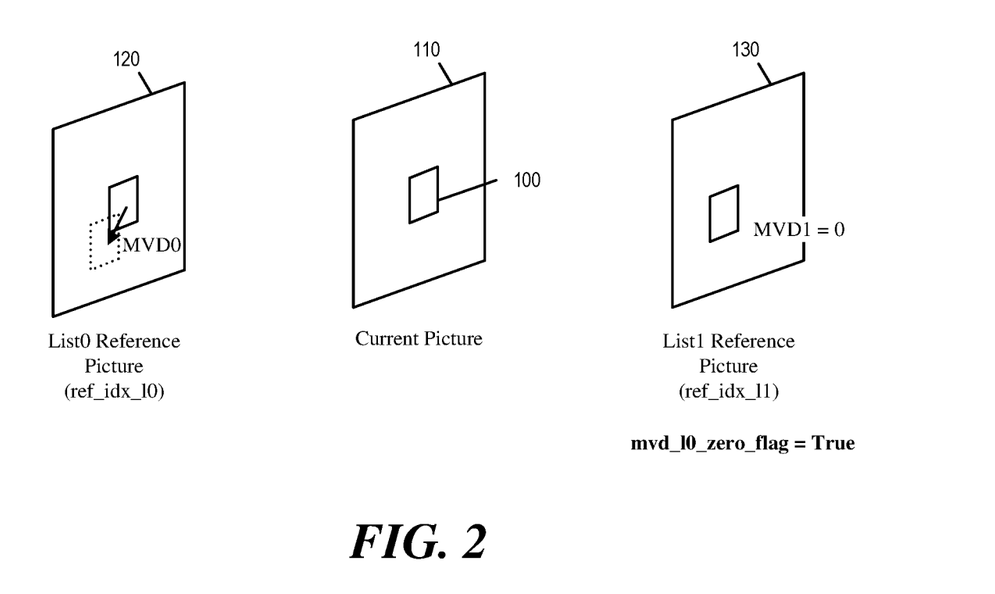
FIG. 2 conceptually illustrates inter-prediction when mvd_l1_zero_flag is true.

FIG. 1 conceptually illustrates inter-prediction of the current block when SMVD mode flag is true. FIG. 2 conceptually illustrates inter-prediction when mvd_l1_zero_flag is true. As illustrated in FIGS. 1-2, a video codec is encoding or decoding a block of pixels 100 (e.g., CU or PU) as a current block at a current picture 110. The L0 reference picture 120 and the L1 reference picture 130 are temporally or POC equally distanced from the current picture. When SMVD mode flag is true, MVD1 is set to be –MVD0. When mvd_l1_zero_flag is true, MVD1 is set to be zero.

Some embodiments of the disclosure provide methods for handling the interaction between (or reconciling) the SMVD mode flag and the mvd_l1_zero_flag, as both of these flags are related to (may affect) the derivation of MVD1. In some embodiments, the condition that the current block (or the current CU/PU) is inter-coded and bi-prediction is allowed is a pre-requisite condition to enabling either the SMVD mode flag or the mvd_l1_zero_flag. Once this pre-requisite condition is satisfied for the current block, a video coder may use SMVD mode flag and/or mvd_l1_zero_flag to determine the derivation of MVD1. In some embodiments, when condition A is not satisfied, the SMVD mode flag is inferred to be false. In some embodiments, when condition B is not satisfied, the mvd_l1_zero_flag is inferred to be false. In some of these embodiments, condition A is not the same as condition B. The following are examples of condition A and condition B:

In some embodiments, condition A (i.e., the enabling condition for SMVD mode) includes (or at least includes) the CU is bi-prediction coded and/or reference pictures satisfying some specific conditions exist, wherein BiDirPredFlag may be used to indicate if reference pictures satisfying some specific conditions exist or not in some embodiments. BiDirPredFlag is derived at slice level as follows: If mvd_l1_zero_flag is 1, BiDirPredFlag is set equal to 0. Otherwise if the nearest reference picture in list-0 and the nearest reference picture in list-1 form a forward and backward pair of reference pictures or a backward and forward pair of reference pictures and both list-0 and list-1 reference pictures are short-term reference pictures, BiDirPredFlag is set to 1. Otherwise BiDirPredFlag is set to 0. In some embodiments, condition A includes (or at least includes) that a selected reference picture in list-0 (referred by RefIdxSymL0) and a selected reference picture in list-1 (referred by Ref IdxSymL1) form a forward and backward pair of reference pictures or a backward and forward pair of reference pictures. In some embodiments, the selected picture in list-0 is the (temporally or POC) nearest reference picture in list-0 to the current picture. In some embodiments, the selected picture in list-1 is the (temporally or POC) nearest reference picture in list-1 to the current picture. In some embodiments, the selected picture in list-0 is signaled at CU/PU, CTU, slice, tile, tile group, SPS, PPS, or picture level. In some embodiments, the selected picture in list-1 is signaled at CU/PU, CTU, slice, tile, tile group, SPS, PPS, or picture level. In some embodiments, the selected picture in list-0 is the first reference picture in list-0. In some embodiments, the selected picture in list-1 is the first reference picture in list-1. In embodiments, any combination of above can be applied.

In some embodiments, condition A includes (or at least includes) that the nearest reference picture in list-0 (referred by RefIdxSymL0) and the nearest reference picture in list-1 (referred by RefIdxSymL1) form a forward and backward pair of reference pictures or a backward and forward pair of reference pictures. In some embodiments, condition A includes (or at least includes) that the first reference picture in list-0 and the first reference picture in list-1 are symmetric. In other words, the first reference picture in list-0 and the first reference picture in list-1 form a forward and backward pair of reference pictures (or a backward and forward pair of reference pictures) and the distance between the current picture and the first reference picture in list-0 is the same as the distance between the current picture and the first reference picture in list-1. In some embodiments, when condition A is satisfied, Ref IdxSymL0 and RefIdxSymL1 are inferred to be zero.

In some embodiments, condition B includes (or at least includes) that any one reference picture in list-0 and any one reference picture in list-1 form a forward and forward pair of reference pictures. (This is referred to as Generalized P and B picture, or GPB, condition).

In some embodiments, if condition A (enabling condition for SMVD mode flag) is satisfied, condition B cannot be satisfied. In some embodiments, condition A includes (or at least includes) mvd_l1_zero_flag is false. In some embodiments, when the condition for SMVD mode flag is satisfied, the condition for mvd_l1_zero_flag is automatically regarded as not satisfied, and mvd_l1_zero_flag is set to false.

In some embodiments, if condition B (enabling condition for mvd_l1_zero_flag) is satisfied, condition A cannot be satisfied. In some embodiments, condition B includes (or at least includes) SMVD mode flag is false. In other words, when the condition for mvd_l1_zero_flag is satisfied, the condition for SMVD mode flag is automatically regarded as not satisfied, and SMVD mode flag is set to false.

In some embodiments, when both mvd_l1_zero_flag and SMVD mode flag are true, MVD1 is set to zero (rather than −MVD0). In some embodiments, when both mvd_l1_zero_flag and SMVD mode flag are true, MVD1 is set to −MVD0 (rather than zero). In some embodiments, condition B is the opposite of condition A. In some embodiments, condition A is the opposite of condition B.

Any of the foregoing proposed methods can be implemented in encoders and/or decoders. For example, any of the proposed methods can be implemented in an inter coding module of an encoder, a motion compensation module, a inter candidate derivation module of a decoder. Alternatively, any of the proposed methods can be implemented as a circuit coupled to the inter coding module of an encoder and/or motion compensation module, a merge/inter candidate derivation module of the decoder.

III. Example Video Encoder

Figure 3:
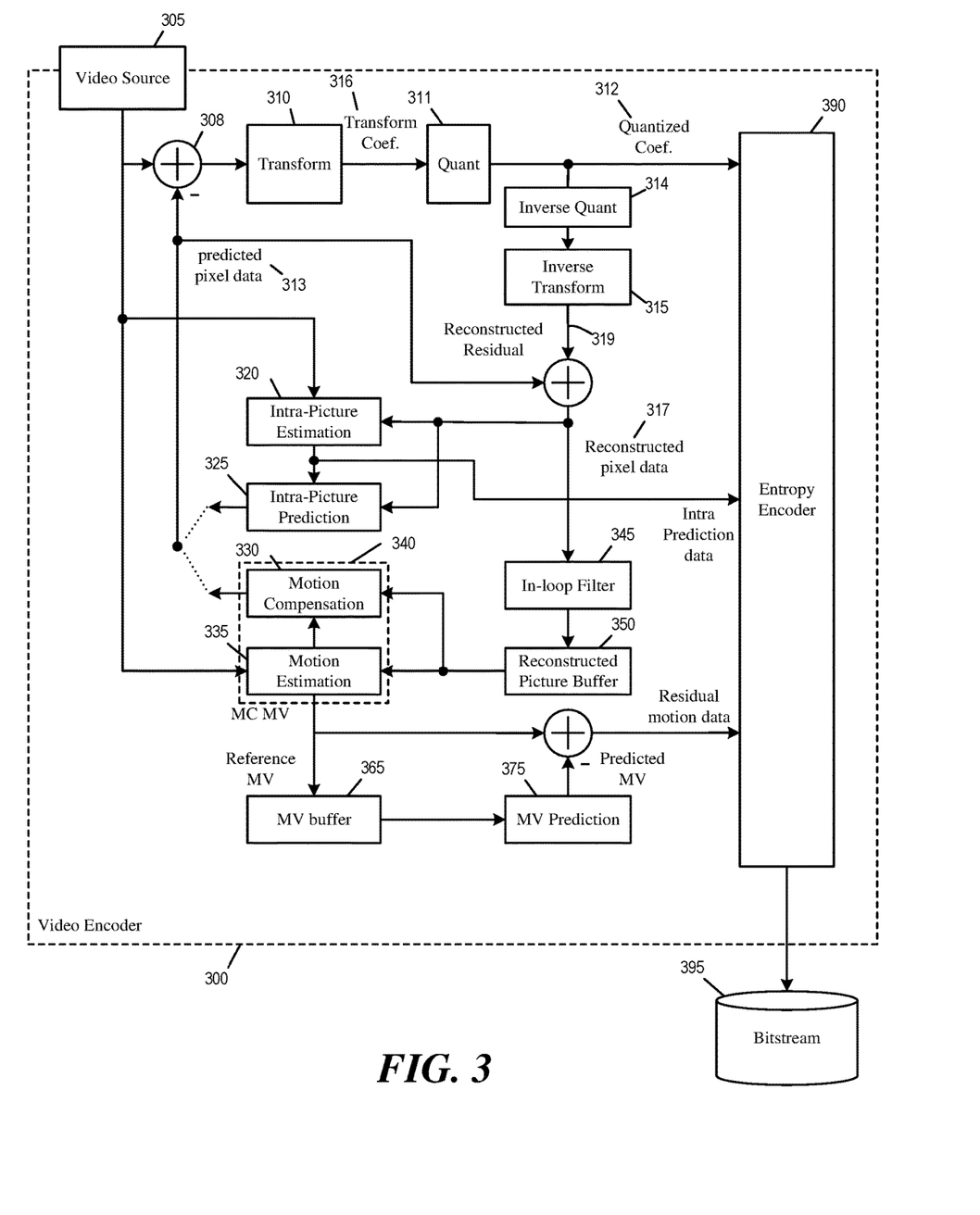
FIG. 3 illustrates an example video encoder.

FIG. 3 illustrates an example video encoder 300. As illustrated, the video encoder 300 receives input video signal from a video source 305 and encodes the signal into bitstream 395. The video encoder 300 has several components or modules for encoding the signal from the video source 305, at least including some components selected from a transform module 310, a quantization module 311, an inverse quantization module 314, an inverse transform module 315, an intra-picture estimation module 320, an intra-prediction module 325, a motion compensation module 330, a motion estimation module 335, an in-loop filter 345, a reconstructed picture buffer 350, a MV buffer 365, and a MV prediction module 375, and an entropy encoder 390. The motion compensation module 330 and the motion estimation module 335 are part of an inter-prediction module 340.

In some embodiments, the modules 310-390 are modules of software instructions being executed by one or more processing units (e.g., a processor) of a computing device or electronic apparatus. In some embodiments, the modules 310-390 are modules of hardware circuits implemented by one or more integrated circuits (ICs) of an electronic apparatus. Though the modules 310-390 are illustrated as being separate modules, some of the modules can be combined into a single module.

The video source 305 provides a raw video signal that presents pixel data of each video frame without compression. A subtractor 308 computes the difference between the raw video pixel data of the video source 305 and the predicted pixel data 313 from the motion compensation module 330 or intra-prediction module 325. The transform module 310 converts the difference (or the residual pixel data or residual signal 309) into transform coefficients (e.g., by performing Discrete Cosine Transform, or DCT). The quantization module 311 quantizes the transform coefficients into quantized data (or quantized coefficients) 312, which is encoded into the bitstream 395 by the entropy encoder 390.

The inverse quantization module 314 de-quantizes the quantized data (or quantized coefficients) 312 to obtain transform coefficients, and the inverse transform module 315 performs inverse transform on the transform coefficients to produce reconstructed residual 319. The reconstructed residual 319 is added with the predicted pixel data 313 to produce reconstructed pixel data 317. In some embodiments, the reconstructed pixel data 317 is temporarily stored in a line buffer (not illustrated) for intra-picture prediction and spatial MV prediction. The reconstructed pixels are filtered by the in-loop filter 345 and stored in the reconstructed picture buffer 350. In some embodiments, the reconstructed picture buffer 350 is a storage external to the video encoder 300. In some embodiments, the reconstructed picture buffer 350 is a storage internal to the video encoder 300.

The intra-picture estimation module 320 performs intra-prediction based on the reconstructed pixel data 317 to produce intra prediction data. The intra-prediction data is provided to the entropy encoder 390 to be encoded into bitstream 395. The intra-prediction data is also used by the intra-prediction module 325 to produce the predicted pixel data 313.

The motion estimation module 335 performs inter-prediction by producing MVs to reference pixel data of previously decoded frames stored in the reconstructed picture buffer 350. These MVs are provided to the motion compensation module 330 to produce predicted pixel data.

Instead of encoding the complete actual MVs in the bitstream, the video encoder 300 uses MV prediction to generate predicted MVs, and the difference between the MVs used for motion compensation and the predicted MVs is encoded as residual motion data and stored in the bitstream 395.

The MV prediction module 375 generates the predicted MVs based on reference MVs that were generated for encoding previously video frames, i.e., the motion compensation MVs that were used to perform motion compensation. The MV prediction module 375 retrieves reference MVs from previous video frames from the MV buffer 365. The video encoder 300 stores the MVs generated for the current video frame in the MV buffer 365 as reference MVs for generating predicted MVs.

The MV prediction module 375 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 395 by the entropy encoder 390.

The entropy encoder 390 encodes various parameters and data into the bitstream 395 by using entropy-coding techniques such as context-adaptive binary arithmetic coding (CABAC) or Huffman encoding. The entropy encoder 390 encodes various header elements, flags, along with the quantized transform coefficients 312, and the residual motion data as syntax elements into the bitstream 395. The bitstream 395 is in turn stored in a storage device or transmitted to a decoder over a communications medium such as a network.

The in-loop filter 345 performs filtering or smoothing operations on the reconstructed pixel data 317 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 4:
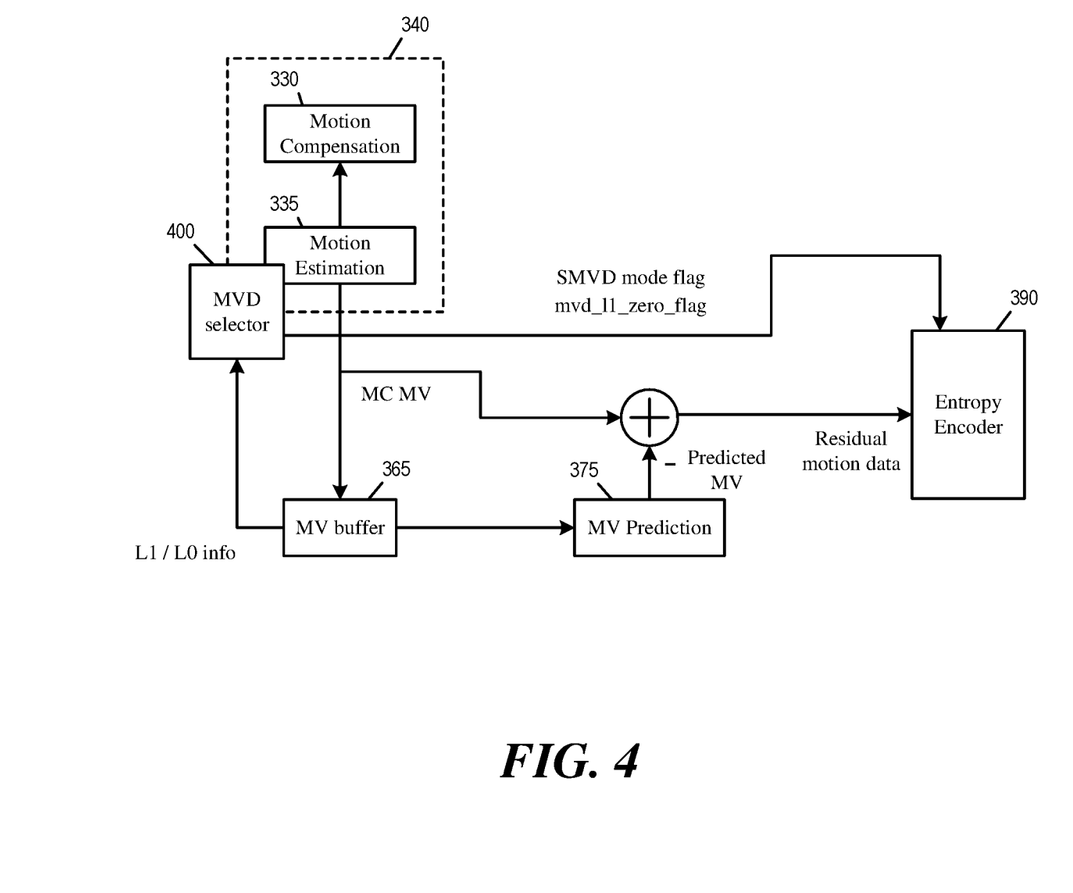
FIG. 4 illustrates portions of the video encoder that may implement SMVD mode and zero L1 MVD mode.

FIG. 4 illustrates portions of the video encoder 300 that may implement SMVD mode and zero L1 MVD mode. As mentioned, the inter-prediction module 340, specifically the motion estimation module 335 outputs a motion vector that is actually used for motion compensation (MC MV). In some embodiments, motion estimation starts symmetric MVD search with an initial MV evaluation when the enabling conditions for SMVD mode are satisfied and the SMVD flag indicates to use SMVD mode. The initial MV is evaluated from a set of initial MV candidates that include: the MV obtained from uni-prediction search, the MV obtained from bi-prediction search, and the MVs from the AMVP list. The MV with the lowest rate-distortion cost is chosen to be the initial MV for the symmetric MVD motion search.

The value of MC MV is determined based on whether the inter-prediction module 340 uses SMVD mode (SMVD mode flag=true), zero L1 MVD mode (mvd_l1_zero_flag=true), or some other mode to perform inter-prediction. If the current block is in a B-slice or B-frame for which bi-directional prediction is allowed and/or the current block is coded by bi-directional prediction. The inter-prediction module 340 perform motion estimation and motion compensation according to an MVD selector module 400 which provide the MVD information associated with SMVD mode flag and/or mvd_l1_zero_flag. SMVD mode flag may be signaled in the bitstream if the enabling conditions for SMVD mode flag are satisfied; otherwise, SMVD mode flag may be derived without signaling. mvd_l1_zero_flag may be signaled in the bitstream if the enabling conditions for mvd_l1_zero_flag are satisfied; otherwise, mvd_l1_zero_flag may be derived without signaling. If SMVD mode is used, the MC MV is set based on MVD1=-MVD0. If zero L1 MVD mode is used, MC MV is set based on MVD1=0. If either SMVD mode flag and/or mvd_l1_zero_flag is set to be true, the entropy encoder 390 may not signal motion vector difference for L1 or residual motion data into the bitstream 395.

Figure 5:
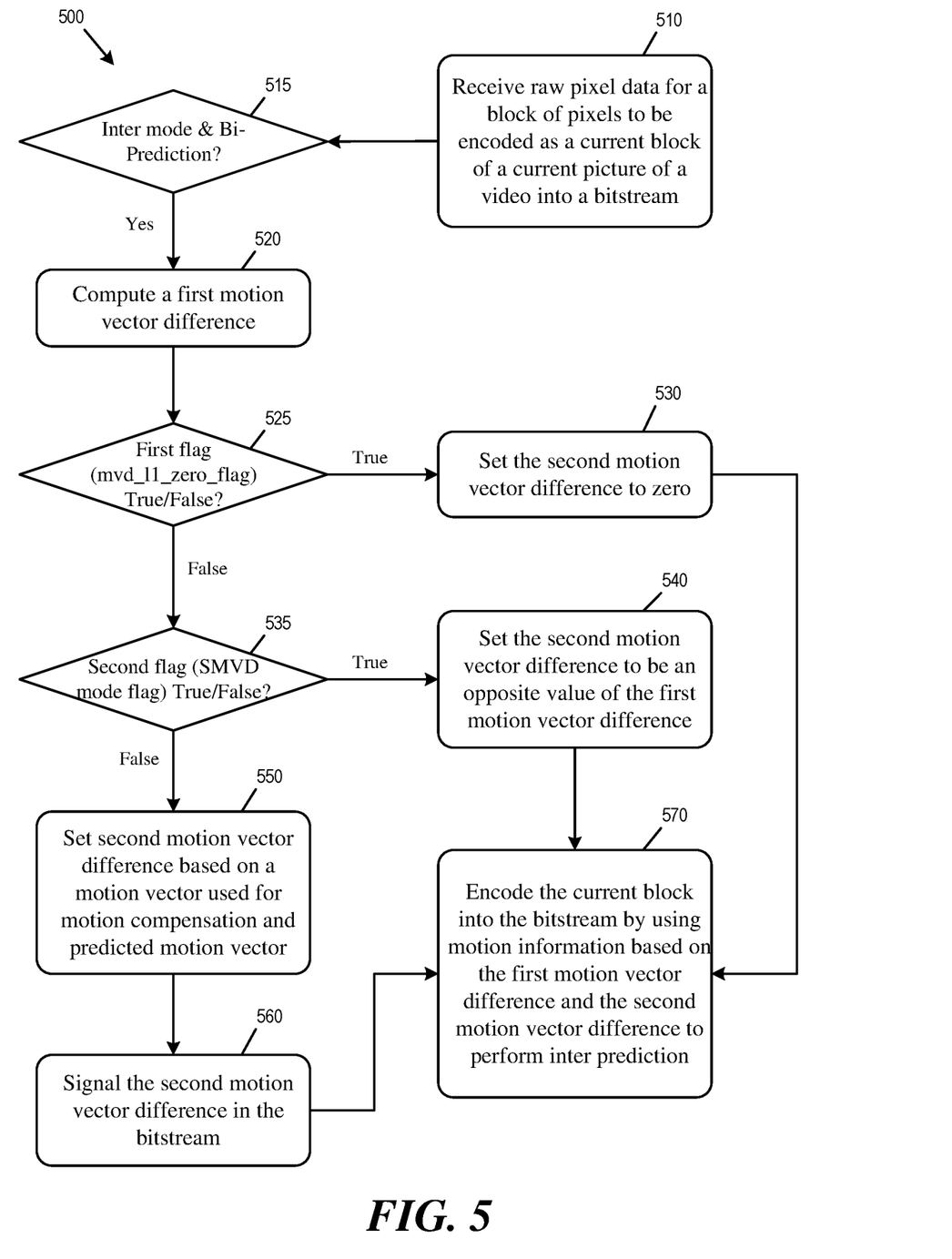
FIG. 5 conceptually illustrates a process for reconciling the SMVD mode and zero L1 MVD mode.

FIG. 5 conceptually illustrates a process 500 for reconciling the SMVD mode and zero L1 MVD mode. In some embodiments, one or more processing units (e.g., a processor) of a computing device implementing the encoder 300 performs the process 500 by executing instructions stored in a computer readable medium. In some embodiments, an electronic apparatus implementing the encoder 300 performs the process 500.

The encoder receives (at block 510) raw pixel data for a block of pixels to be encoded as a current block of a current picture of a video into a bitstream. The encoder determines (at block 515) whether the current block is coded by using inter mode and bi-prediction. If so, the process proceed to 520. If the current block is not coded by inter mode and bi-prediction, the video encoder encodes the current block by other coding modes.

The encoder receives (at block 520) or computes a first motion vector difference. The encoder determines (at block 525) whether a first flag (mvd_l1_zero_flag) is true or false. In some embodiments, the first flag (mvd_l1_zero_flag) is signaled at a picture level. In some embodiments, the mvd_l1_zero_flag may be signaled at CU/PU, CTU, slice, tile, tile group, SPS, or PPS level. If the first flag is true, the encoder proceeds to block 530. If the first flag is false, the process proceeds to block 535. In some embodiments, the enabling condition for SMVD mode (or condition A) at least include that the mvd_l1_zero_flag is false.

At block 530, the encoder sets a second motion vector (i.e., MVD1) to zero, since the first flag (mvd_l1_zero_flag) indicates that zero L1 MVD mode is used. In some embodiments, the first and second motion vector differences are associated with first and second reference pictures. In some embodiments, the first reference picture is selected from a first reference picture list and the second reference picture is selected from a second reference picture list. In some embodiments, the first and second reference pictures form a forward-and-forward pair of reference pictures. This is referred to as Generalized P and B picture, or GPB, condition. The process then proceeds to block 570.

At block 535, the encoder determines whether a second flag (SMVD mode flag) is true or false. In some embodiments, the second flag (SMVD mode flag) is signaled at coding unit (CU) level for the current block. In some embodiments, the SMVD mode flag may be signaled at CTU, slice, tile, tile group, SPS, PPS, or picture level. If the second flag is true, the process proceeds to block 540. If the second flag is false, the process proceeds to block 550.

At block 540, the encoder sets the second motion vector difference (i.e., MVD1) to be at an opposite value of the of the first motion vector difference (i.e., -MVD0). In some embodiments, the first and second motion vector differences are associated with first and second reference pictures that are symmetrically or equally distanced from the current picture. In some embodiments, the encoder may select the first reference picture selected from a first reference picture list and the second reference picture from a second reference picture list. In some embodiments, the first and second reference pictures form a backward-and-forward pair or a forward-and-backward pair of reference pictures. In some embodiments, the first reference picture is a temporally or POC nearest picture to the current picture in the first reference picture list and the second reference picture is a temporally or POC nearest picture to the current picture in the second reference picture list. The process then proceeds to block 570.

At block 550, the encoder sets the second motion vector difference (i.e., MVD1) based on a motion vector used for motion compensation and a predicted motion vector. The process then signals (at block 560) the second motion vector difference (MVD1) in the bitstream. In some embodiments, when either the first flag or the second flag is true, the second motion vector difference (MVD1) is not signaled in the bitstream.

The process encodes (at block 570) the current block into the bitstream by using motion information based on the first motion vector difference (MVD0) and the second motion vector difference (MVD1) to perform inter prediction, specifically, bi-prediction. In some embodiments, SMVD mode flag and mvd_l1_zero_flag are considered by the video encoder for inter-prediction only when bi-directional prediction is allowed for the current block and/or only when the current block is in a B-slice or B-picture.

IV. Example Video Decoder

Figure 6:
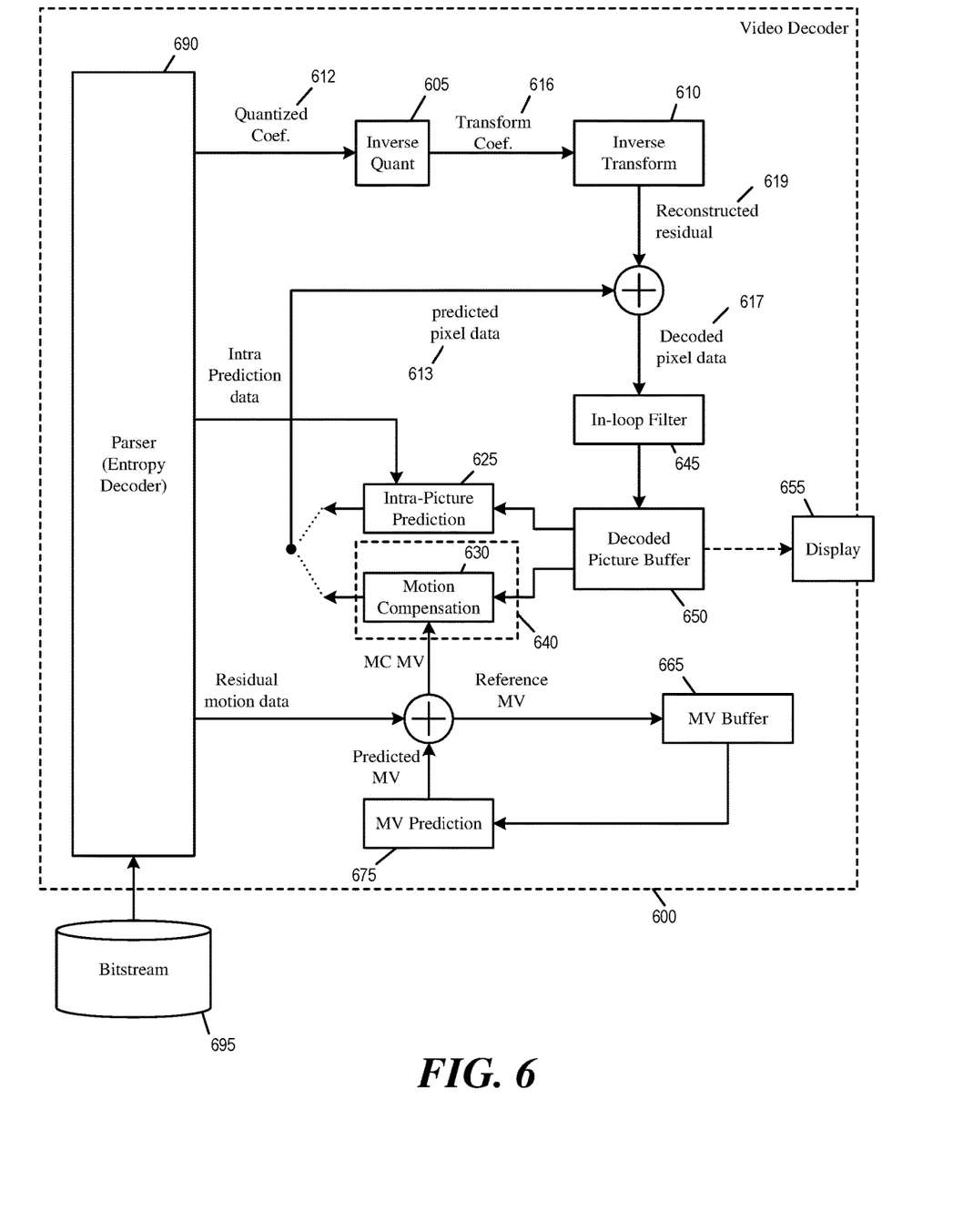
FIG. 6 illustrates an example video decoder.

FIG. 6 illustrates an example video decoder 600. As illustrated, the video decoder 600 is an image-decoding or video-decoding circuit that receives a bitstream 695 and decodes the content of the bitstream into pixel data of video frames for display. The video decoder 600 has several components or modules for decoding the bitstream 695, including some components selected from an inverse quantization module 605, an inverse transform module 610, an intra-prediction module 625, a motion compensation module 630, an in-loop filter 645, a decoded picture buffer 650, a MV buffer 665, a MV prediction module 675, and a parser 690. The motion compensation module 630 is part of an inter-prediction module 640.

In some embodiments, the modules 610-690 are modules of software instructions being executed by one or more processing units (e.g., a processor) of a computing device. In some embodiments, the modules 610-690 are modules of hardware circuits implemented by one or more ICs of an electronic apparatus. Though the modules 610-690 are illustrated as being separate modules, some of the modules can be combined into a single module.

The parser 690 (or entropy decoder) receives the bitstream 695 and performs initial parsing according to the syntax defined by a video-coding or image-coding standard. The parsed syntax element includes various header elements, flags, as well as quantized data (or quantized coefficients) 612. The parser 690 parses out the various syntax elements by using entropy-coding techniques such as context-adaptive binary arithmetic coding (CABAC) or Huffman encoding.

The inverse quantization module 605 de-quantizes the quantized data (or quantized coefficients) 612 to obtain transform coefficients, and the inverse transform module 610 performs inverse transform on the transform coefficients 616 to produce reconstructed residual signal 619. The reconstructed residual signal 619 is added with predicted pixel data 613 from the intra-prediction module 625 or the motion compensation module 630 to produce decoded pixel data 617. The decoded pixels data are filtered by the in-loop filter 645 and stored in the decoded picture buffer 650. In some embodiments, the decoded picture buffer 650 is a storage external to the video decoder 600. In some embodiments, the decoded picture buffer 650 is a storage internal to the video decoder 600.

The intra-prediction module 625 receives intra-prediction data from bitstream 695 and according to which, produces the predicted pixel data 613 from the decoded pixel data 617 stored in the decoded picture buffer 650. In some embodiments, the decoded pixel data 617 is also stored in a line buffer (not illustrated) for intra-picture prediction and spatial MV prediction.

In some embodiments, the content of the decoded picture buffer 650 is used for display. A display device 655 either retrieves the content of the decoded picture buffer 650 for display directly, or retrieves the content of the decoded picture buffer to a display buffer. In some embodiments, the display device receives pixel values from the decoded picture buffer 650 through a pixel transport.

The motion compensation module 630 produces predicted pixel data 613 from the decoded pixel data 617 stored in the decoded picture buffer 650 according to motion compensation MVs (MC MVs). These motion compensation MVs are decoded by adding the residual motion data received from the bitstream 695 with predicted MVs received from the MV prediction module 675.

The MV prediction module 675 generates the predicted MVs based on reference MVs that were generated for decoding previous video frames, e.g., the motion compensation MVs that were used to perform motion compensation. The MV prediction module 675 retrieves the reference MVs of previous video frames from the MV buffer 665. The video decoder 600 stores the motion compensation MVs generated for decoding the current video frame in the MV buffer 665 as reference MVs for producing predicted MVs.

The in-loop filter 645 performs filtering or smoothing operations on the decoded pixel data 617 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 7:
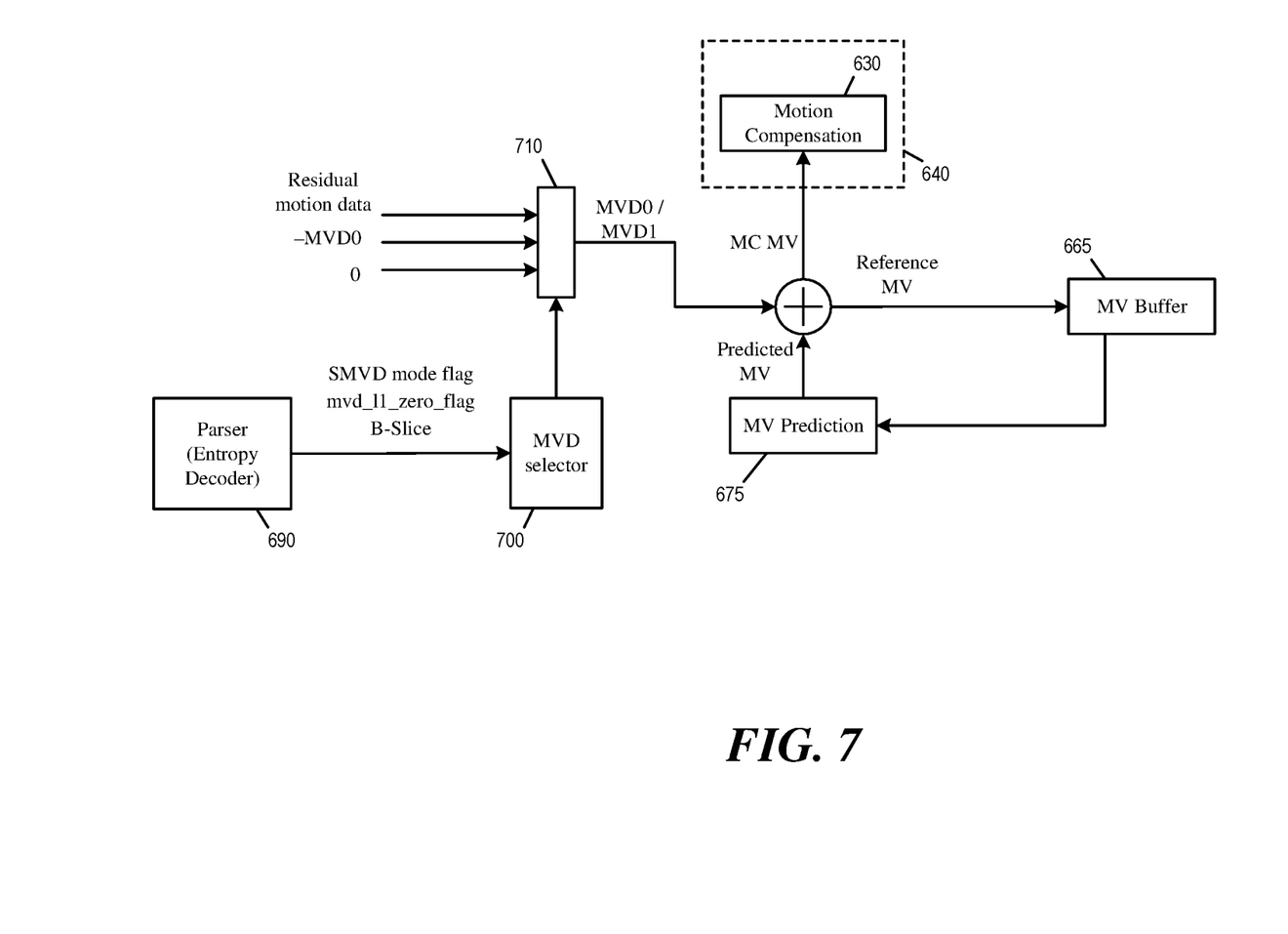
FIG. 7 illustrates portions of the video decoder that may implement SMVD mode and zero L1 MVD mode.

FIG. 7 illustrates portions of the video decoder 600 that may implement SMVD mode and zero L1 MVD mode. As illustrated, the entropy decoder 690 may parses out SMVD mode flag and/or mvd_l1_zero _flag from the bitstream 695. The entropy decoder may parse out the SMVD mode flag if the enabling conditions for SMVD mode flag are satisfied; otherwise, SMVD mode flag may be derived without signaling. The entropy decoder may parse out the mvd_l1_zero_flag if the enabling conditions for mvd_l1_zero_flag are satisfied; otherwise, mvd_l1_zero_flag may be derived without signaling. The entropy decoder 690 also parses syntax elements from the bitstream that signals whether the current block is in a B-slice or B-frame, and/or whether the current block is bi-predicted or derive without syntax to decide whether the current block is in a B-slice or B-frame.

If the current block is in a B-slice or B-frame, bi-prediction is allowed, and/or the current block is coded by bi-directional prediction, an MVD selector module 700 determines whether to use SMVD mode or zero L1 MVD mode based on the SMVD mode flag and/or mvd_l1_zero_flag.

When the MVD selector module 700 determines that SMVD mode is used, −MVD0 is used as the L1 motion vector difference (MVD1) as the motion vector difference when constructing the motion vector for motion compensation (MC MV). When the MVD selector module 700 determines that zero L1 MVD mode is used, zero is used as the L1 motion vector difference when constructing the motion vector for motion compensation (MC MV). In other situations, residual motion data parsed from the bitstream by the entropy decoder 690 is used to reconstruct the motion vector for motion compensation. The MVD0 and MVD1 are then used to compute the motion vector for motion compensation (MC MV) by adding the predicted MV.

Figure 8:
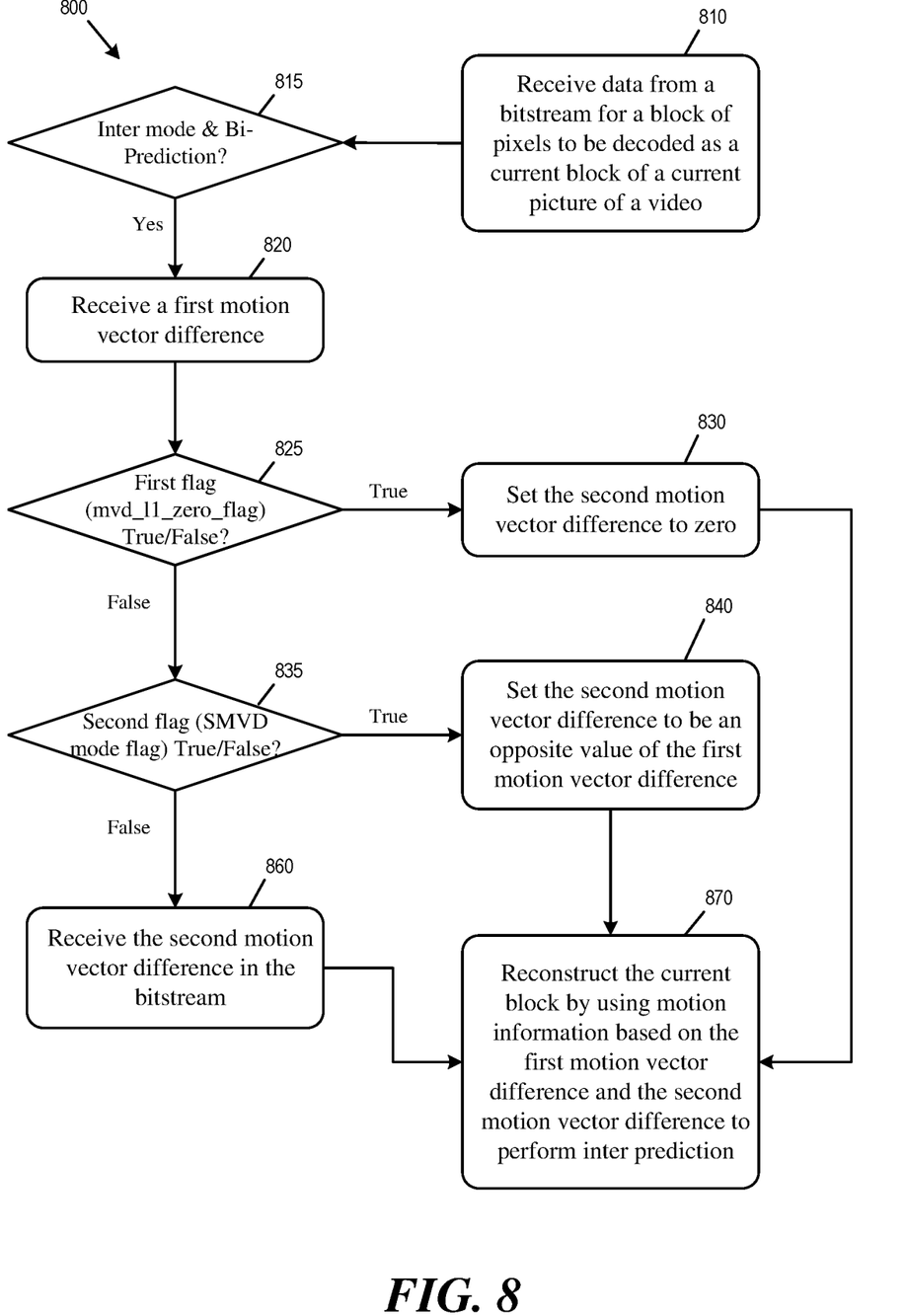
FIG. 8 conceptually illustrates a process for reconciling the SMVD mode and zero L1 MVD mode.

FIG. 8 conceptually illustrates a process 800 for reconciling the SMVD mode and zero L1 MVD mode. In some embodiments, one or more processing units (e.g., a processor) of a computing device implementing the decoder 600 performs the process 800 by executing instructions stored in a computer readable medium. In some embodiments, an electronic apparatus implementing the decoder 600 performs the process 800.

The decoder receives (at block 810) data from a bitstream for a block of pixels to be decoded as a current block of a current picture of a video. The decoder determines (at block 815) whether the current block is coded by using inter mode and bi-prediction. If so, the process proceed to 820. If the current block is not coded by inter mode and bi-prediction, the video decoder reconstructs the current block based on other coding modes.

The decoder receives (at block 820) a first motion vector difference (i.e., MVD0) from the bitstream. The decoder determines (at block 825) whether a first flag (mvd_l1_zero_flag) is true or false. In some embodiments, the first flag (mvd_l1_zero_flag) is signaled at a picture level. In some embodiments, the mvd_l1_zero_flag may be signaled at CU/PU, CTU, slice, tile, tile group, SPS, or PPS level. If the first flag is true, the decoder proceeds to block 830. If the first flag is false, the process proceeds to block 835. In some embodiments, the enabling condition for SMVD mode (or condition A) at least include that the mvd_l1_zero_flag is false.

At block 830, the decoder sets a second motion vector (i.e., MVD1) to zero, since the first flag (mvd_l1_zero_flag) indicates that zero L1 MVD mode is used. In some embodiments, the first and second motion vector differences are associated with first and second reference pictures. In some embodiments, the first reference picture is selected from a first reference picture list and the second reference picture is selected from a second reference picture list. In some embodiments, the first and second reference pictures form a forward-and-forward pair of reference pictures. This is referred to as Generalized P and B picture, or GPB, condition. The process then proceeds to block 870.

At block 835, the decoder determines whether a second flag (SMVD mode flag) is true or false. In some embodiments, the second flag (SMVD mode flag) is signaled at coding unit (CU) level for the current block. In some embodiments, the SMVD mode flag may be signaled at CTU, slice, tile, tile group, SPS, PPS, or picture level. If the second flag is true, the process proceeds to block 840. If the second flag is false, the process proceeds to block 860.

At block 840, the decoder sets the second motion vector difference (i.e., MVD1) to be at an opposite value of the of the first motion vector difference (i.e., −MVD0). In some embodiments, the first and second motion vector differences are associated with first and second reference pictures that are symmetrically or equally distanced from the current picture. In some embodiments, the decoder may select the first reference picture selected from a first reference picture list and the second reference picture from a second reference picture list. In some embodiments, the first and second reference pictures form a backward-and-forward pair or a forward-backward pair of reference pictures. In some embodiments, the first reference picture is a temporally or POC nearest picture to the current picture in the first reference picture list and the second reference picture is a temporally or POC nearest picture to the current picture in the second reference picture list. The process then proceeds to block 870.

The process then receives (at block 860) the second motion vector difference (MVD1) in the bitstream. In some embodiments, when either the first flag or the second flag is true, the second motion vector difference (MVD1) is not signaled in the bitstream.

The decoder reconstructs (at block 870) the current block by using motion information based on the first motion vector difference and the second motion vector difference to perform inter prediction, specifically, bi-prediction. In some embodiments, SMVD mode flag and mvd_l1_zero_flag are considered by the video decoder for inter-prediction only when bi-directional prediction is allowed for the current block and/or only when the current block is in a B-slice or B-picture (the pre-requisite condition).

V. Example Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 9:
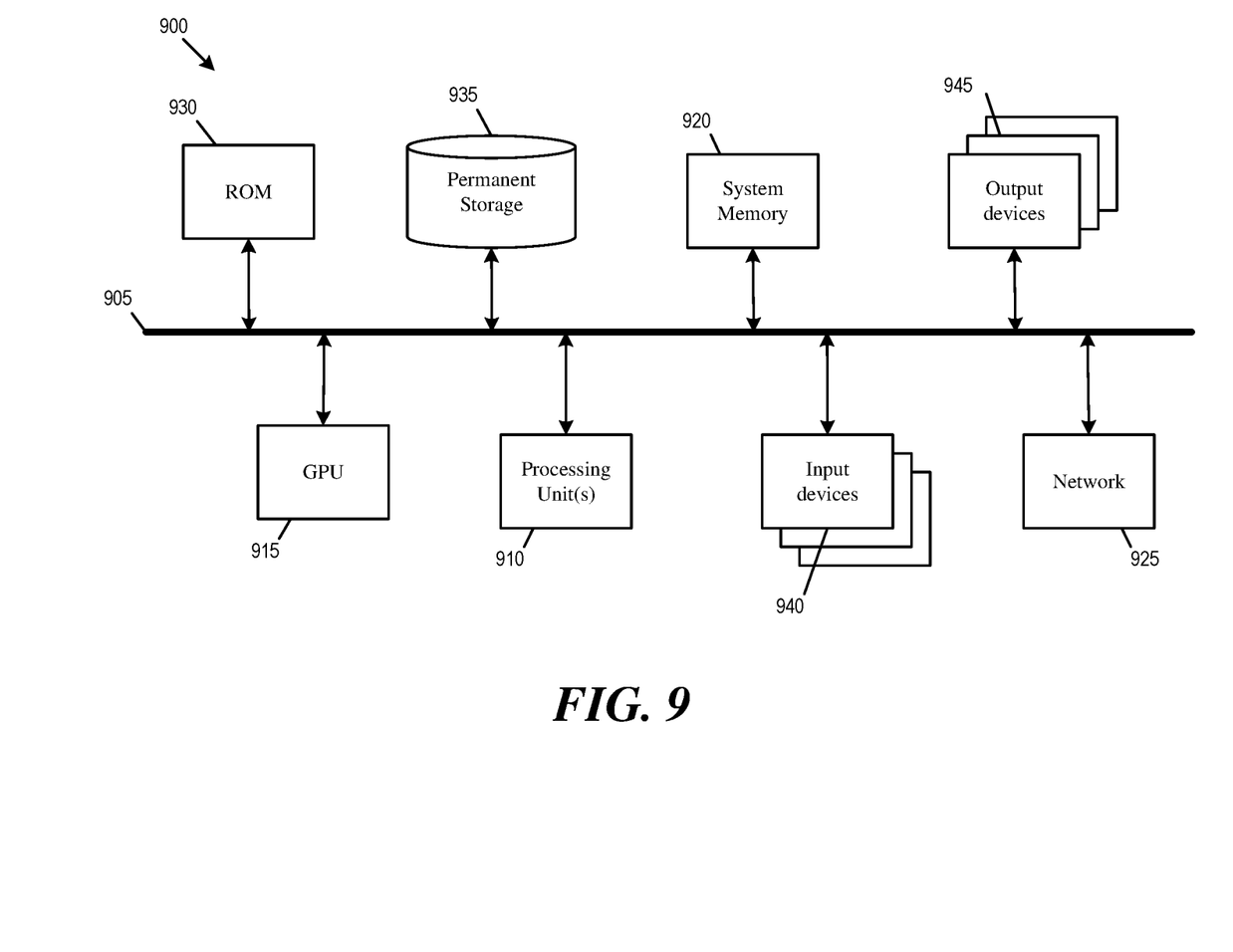
FIG. 9 conceptually illustrates an electronic system with which some embodiments of the present disclosure are implemented.

FIG. 9 conceptually illustrates an electronic system 900 with which some embodiments of the present disclosure are implemented. The electronic system 900 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 900 includes a bus 905, processing unit(s) 910, a graphics-processing unit (GPU) 915, a system memory 920, a network 925, a read-only memory 930, a permanent storage device 935, input devices 940, and output devices 945.

The bus 905 collectively represents all system, peripheral, and chipset buses that communicatively connect the numerous internal devices of the electronic system 900. For instance, the bus 905 communicatively connects the processing unit(s) 910 with the GPU 915, the read-only memory 930, the system memory 920, and the permanent storage device 935.

From these various memory units, the processing unit(s) 910 retrieves instructions to execute and data to process in order to execute the processes of the present disclosure. The processing unit(s) may be a single processor or a multi-core processor in different embodiments. Some instructions are passed to and executed by the GPU 915. The GPU 915 can offload various computations or complement the image processing provided by the processing unit(s) 910.

The read-only-memory (ROM) 930 stores static data and instructions that are used by the processing unit(s) 910 and other modules of the electronic system. The permanent storage device 935, on the other hand, is a read-and-write memory device. This device is a non-volatile memory unit that stores instructions and data even when the electronic system 900 is off. Some embodiments of the present disclosure use a mass-storage device (such as a magnetic or optical disk and its corresponding disk drive) as the permanent storage device 935.

Other embodiments use a removable storage device (such as a floppy disk, flash memory device, etc., and its corresponding disk drive) as the permanent storage device. Like the permanent storage device 935, the system memory 920 is a read-and-write memory device. However, unlike storage device 935, the system memory 920 is a volatile read-and-write memory, such a random access memory. The system memory 920 stores some of the instructions and data that the processor uses at runtime. In some embodiments, processes in accordance with the present disclosure are stored in the system memory 920, the permanent storage device 935, and/or the read-only memory 930. For example, the various memory units include instructions for processing multimedia clips in accordance with some embodiments. From these various memory units, the processing unit(s) 910 retrieves instructions to execute and data to process in order to execute the processes of some embodiments.

The bus 905 also connects to the input and output devices 940 and 945. The input devices 940 enable the user to communicate information and select commands to the electronic system. The input devices 940 include alphanumeric keyboards and pointing devices (also called "cursor control devices"), cameras (e.g., webcams), microphones or similar devices for receiving voice commands, etc. The output devices 945 display images generated by the electronic system or otherwise output data. The output devices 945 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 9, bus 905 also couples electronic system 900 to a network 925 through a network adapter (not shown). In this manner, the computer can be a part of a network of computers (such as a local area network ("LAN"), a wide area network ("WAN"), or an Intranet, or a network of networks, such as the Internet. Any or all components of electronic system 900 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIGS. 5 and 8) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A video decoding method, comprising:
    receiving encoded data associated with a current coding unit (CU) of a current picture of a video;
    determining, based on the encoded data, whether the current CU is coded according to bi-directional prediction; and
    in a case that the current CU is determined to be coded according to the bi-directional prediction, performing:
        determining a first motion vector difference for a first prediction direction of the bi-directional prediction;
        after the first motion vector difference is determined, determining a second motion vector difference for a second prediction direction of the bi-directional prediction, including:
            determining whether a first flag indicates the second motion vector difference being zero;
            in a case that the first flag is deteiiiined to indicate the second motion vector difference being zero, setting the second motion vector difference to a zero vector;
            in a case that the first flag is determined to not indicate the second motion vector difference being zero,
                setting the second motion vector difference to be an opposite value of the first motion vector difference when a second flag has a first value, and
                receiving the second motion vector difference from the encoded data when the second flag has a second value; and
        reconstructing the current CU according to the bi-directional prediction performed based on the first motion vector difference and the second motion vector difference.

2. The video decoding method of claim 1, wherein the first flag is signaled at a picture level.

3. The video decoding method of claim 1, wherein the second flag is signaled at a CU level for the current CU.

4. The video decoding method of claim 1, wherein when either the first flag or the second flag is true, the second motion vector difference is not signaled.

5. The video decoding method of claim 1, wherein an Advanced Motion Vector Prediction (AMVP) mode is used for the current CU.

6. The video decoding method of claim 1, wherein the first and second motion vector differences are associated with first and second reference pictures that are symmetrically or equally distanced from the current picture.

7. The video decoding method of claim 6, wherein the first reference picture is selected from a first reference picture list and the second reference picture is selected from a second reference picture list, wherein the first and second reference pictures form a backward-and-forward pair of reference pictures.

8. The video decoding method of claim 7, wherein the first reference picture is a temporally nearest picture to the current picture in the first reference picture list and the second reference picture is a temporally nearest picture to the current picture in the second reference picture list.

9. The video decoding method of claim 1, wherein when the first flag is true, the second motion vector difference is set to zero.

10. The video decoding method of claim 9, wherein the first and second motion vector differences are associated with first and second reference pictures, wherein the first reference picture is selected from a first reference picture list and the second reference picture is selected from a second reference picture list, wherein the first and second reference pictures form a forward-and-forward pair of reference pictures.

11. A video encoding method, comprising:
    receiving pixel data of a current coding unit (CU) of a current picture;

determining whether the current CU is coded according to bi-directional prediction; and in a case that the current CU is determined to be coded according to the bi-directional prediction:

determining a first motion vector difference for a first prediction direction of the bi-directional prediction;

after the first motion vector difference is determined, determining a second motion vector difference for a second prediction direction of the bi-directional prediction, including:

determining whether a first flag indicates the second motion vector difference being zero;

in a case that the first flag is determined to indicate the second motion vector difference being zero, setting the second motion vector difference to a zero vector;

in a case that the first flag is determined to not indicate the second motion vector difference being zero, setting the second motion vector difference to be at an opposite value of the first motion vector difference when a second flag has a first value, and determining the second motion vector difference when the second flag has a second value; and encoding the current CU according to the bi-directional prediction performed based on the first motion vector difference and the second motion vector difference.

12. The video encoding method of claim 11, wherein the first flag is signaled at a picture level.

13. The video decoding method of claim 11, wherein the second flag is signaled at a CU level for the current CU.

14. An electronic apparatus, comprising:

a video decoder circuit configured to perform operations comprising:

receiving encoded data associated with a current coding unit (CU) of a current picture of a video; and determining, based on the encoded data, whether the current CU is coded according to bi-directional prediction; and in a case that the current CU is determined to be coded according to the bi-directional prediction, performing:

determining a first motion vector difference for a first prediction direction of the bi-directional prediction:

after the first motion vector difference is determined, determining a second motion vector difference for a second prediction direction of the bi-directional prediction, including:

determining whether a first flag indicates the second motion vector difference being zero;

in a case that the first flag is determined to indicate the second motion vector difference being zero, setting the second motion vector difference to a zero vector;

in a case that the first flag is determined to not indicate the second motion vector difference being zero, setting the second motion vector difference to be an opposite value of the first motion vector difference when a second flag has a first value, and receiving the second motion vector difference from the encoded data when the second flag has a second value; and reconstructing the current CU according to the bi-directional prediction performed based on the first motion vector difference and the second motion vector difference.

15. The electronic apparatus of claim 14, wherein the first flag is signaled at a picture level.

16. The electronic apparatus of claim 14, wherein the second flag is signaled at a CU level for the current CU.

17. A video coding method, comprising:

receiving data to be encoded or decoded as a current coding unit (CU) of a current picture of a video; and determining, based on the received data, whether the current CU is coded according to bi-directional prediction; and in a case that the current CU is determined to be coded according to the bi-directional prediction, performing:

determining a first motion vector difference for a first prediction direction of the bi-directional prediction;

after the first motion vector difference is determined, determining a second motion vector difference for a second prediction direction of the bi-directional prediction, including determining whether a first flag indicates the second motion vector difference being zero;

in a case that the first flag is determined to indicate the second motion vector difference being zero, setting the second motion vector difference to a zero vector;

in a case that the first flag is detei lined to not indicate the second motion vector difference being zero, setting the second motion vector difference to be at an opposite value of the first motion vector difference when a second flag has a first value, and determining the second motion vector difference when the second flag has a second value; and encoding or decoding the current CU according to the bi-directional prediction performed based on the first motion vector difference and the second motion vector difference.

18. The video coding method of claim 17, wherein the first flag is signaled at a picture level.

19. The video coding method of claim 17, wherein the second flag is signaled at a CU level for the current CU.

* * * * *